(12) United States Patent
Marinescu et al.

(10) Patent No.: US 12,276,081 B2
(45) Date of Patent: Apr. 15, 2025

(54) LUBRICATION DISTRIBUTION SYSTEM FOR MACHINE WITH KINEMATIC LINKAGES

(71) Applicant: Caterpillar Inc., Peoria, IL (US)

(72) Inventors: Dragos Marinescu, Montgomery, IL (US); Brian C. Howson, Bolingbrook, IL (US); Matthew J. Fritzke, Watertown, MN (US); Matthew T. Hansen, Big Rock, IL (US)

(73) Assignee: Caterpillar Inc., Peoria, IL (US)

( * ) Notice: Subject to any disclaimer, the term of this patent is extended or adjusted under 35 U.S.C. 154(b) by 361 days.

(21) Appl. No.: 17/833,390

(22) Filed: Jun. 6, 2022

(65) Prior Publication Data
US 2023/0392348 A1    Dec. 7, 2023

(51) Int. Cl.
| | |
|---|---|
| E02F 9/08 | (2006.01) |
| F16N 7/38 | (2006.01) |
| F16N 25/00 | (2006.01) |
| F16N 29/02 | (2006.01) |
| E02F 3/34 | (2006.01) |

(52) U.S. Cl.
CPC .......... *E02F 9/0858* (2013.01); *E02F 9/0841* (2013.01); *F16N 7/38* (2013.01); *F16N 25/00* (2013.01); *F16N 29/02* (2013.01); *E02F 3/34* (2013.01)

(58) Field of Classification Search
CPC .. F16N 7/38; F16N 25/00; F16N 29/02; E02F 9/0841
See application file for complete search history.

(56) References Cited

U.S. PATENT DOCUMENTS

| | | | | |
|---|---|---|---|---|
| 5,060,761 A | * | 10/1991 | Arndt | F16N 29/04 |
| | | | | 184/29 |
| 5,381,874 A | * | 1/1995 | Hadank | F16N 29/02 |
| | | | | 184/6 |
| 5,482,138 A | * | 1/1996 | Mori | F16N 29/02 |
| | | | | 184/6 |
| 5,823,295 A | * | 10/1998 | Griffith | F16N 7/385 |
| | | | | 184/6 |

(Continued)

FOREIGN PATENT DOCUMENTS

| | | |
|---|---|---|
| CN | 203023773 U | 6/2013 |
| DE | 202008014921 U1 | 2/2009 |
| DE | 102016213102 A1 | 1/2018 |

OTHER PUBLICATIONS

DE202008014921—machine translation (Year: 2008).*
German office action for Germany Patent Appln. No. 10 2023 114 156.2, mailed Nov. 9, 2023 (9 pgs).

*Primary Examiner* — Michael A Riegelman

(57) ABSTRACT

A machine including a first kinematic joint, wherein the first kinematic joint is lubricated based on a first schedule and a second kinematic joint, wherein the second kinematic joint is lubricated based on a second schedule. The first schedule is different than the second schedule. A lubricant pump is configured to pump a lubricant and a distribution valve is in communication with the lubricant pump. The distribution valve has a first fluid outlet configured to supply the lubricant from the lubricant pump to the first kinematic joint and a second fluid outlet configured to supply the lubricant from the lubricant pump to the second kinematic joint.

22 Claims, 4 Drawing Sheets

(56) References Cited

U.S. PATENT DOCUMENTS

| | | | | |
|---|---|---|---|---|
| 7,134,323 | B1* | 11/2006 | Discenzo | G01N 33/2888 |
| | | | | 702/183 |
| 7,374,019 | B2* | 5/2008 | Kosugi | F16N 37/003 |
| | | | | 384/473 |
| 8,562,321 | B2* | 10/2013 | Urata | B29C 45/83 |
| | | | | 425/150 |
| 9,169,970 | B2* | 10/2015 | Gillespie | F16N 7/38 |
| 9,303,814 | B2* | 4/2016 | Ifield | F16N 7/385 |
| 11,105,464 | B2* | 8/2021 | Letscher | F16N 7/385 |
| 2004/0250623 | A1* | 12/2004 | Walker | F16C 33/102 |
| | | | | 73/593 |
| 2009/0057063 | A1* | 3/2009 | Marek | F16N 29/00 |
| | | | | 184/7.4 |
| 2011/0308888 | A1* | 12/2011 | Carothers | F16N 7/38 |
| | | | | 184/6.1 |
| 2012/0043163 | A1* | 2/2012 | Jagdale | B25D 17/26 |
| | | | | 184/6.14 |
| 2014/0153997 | A1* | 6/2014 | Ditzler | E02F 9/2275 |
| | | | | 403/38 |
| 2015/0107329 | A1* | 4/2015 | Conley | F16N 29/00 |
| | | | | 73/7 |
| 2017/0114957 | A1* | 4/2017 | Conley | F16N 29/02 |
| 2018/0017210 | A1* | 1/2018 | Letscher | F16N 29/02 |
| 2018/0156384 | A1* | 6/2018 | Yamane | B25J 13/08 |
| 2019/0024547 | A1* | 1/2019 | Gustafson | F04C 14/00 |
| 2019/0120424 | A1* | 4/2019 | Gratton | G01C 19/16 |
| 2019/0263341 | A1* | 8/2019 | Gustafson | F16N 29/02 |
| 2020/0018440 | A1* | 1/2020 | Shiratani | E02F 9/0858 |
| 2020/0217048 | A1* | 7/2020 | Kumar | E02F 9/268 |
| 2020/0271143 | A1* | 8/2020 | Binstock | E02F 9/2267 |
| 2020/0407941 | A1* | 12/2020 | Strashny | E02F 9/00 |
| 2021/0025134 | A1* | 1/2021 | Shiratani | F16N 29/02 |
| 2022/0090355 | A1* | 3/2022 | Yasuda | F16C 33/102 |
| 2022/0127980 | A1* | 4/2022 | Talen | B05B 12/04 |
| 2023/0243466 | A1* | 8/2023 | Howson | E02F 9/265 |
| | | | | 184/6.4 |
| 2023/0392348 | A1* | 12/2023 | Marinescu | F16N 7/38 |

\* cited by examiner

LUBRICATION DISTRIBUTION SYSTEM FOR MACHINE WITH KINEMATIC LINKAGES

TECHNICAL FIELD

This patent disclosure relates generally to a mechanical machine that includes one or more kinematic linkages having one or more kinematic joints and, more particularly, relates to a lubrication distribution system for lubricating the one or more kinematic joints of the machine.

BACKGROUND

Mechanical machines often comprise one or more kinematic linkages that enable motion of the machine to perform various tasks. A kinematic linkage may include one or more rigid bodies or links that are joined together by a kinematic joint so that the links can move with respect to each other. Examples of pivot joints include pin joints, also referred to as revolute joints, in which two rigid links are joined by a cylindrical pin that is inserted through a circular aperture defined by structural eyes formed on the two rigid links. The two rigid links can articulate with respect to each other by pivoting or rotating about a pin axis associated with the pin. A common example of a pin joint may be a hinge. Other examples of pivot joints associated with a machine may be ball and socket joints. And, more broadly, other examples of kinematic joints include sliding joints that enable two rigid bodies to slide with respect to each other. Moreover, more complex mechanical machines may be made of several kinematic linkages that include several kinematic joints to enable complex motions of the machine to perform the desired tasks. Examples of a kinematic joint includes revolute, prismatic, screw, cylindrical, spherical or ball, planar joints, roller, cam, and universal joints.

Because kinematic joints involve links that move with respect to each other, the kinematic joints typically benefit from periodic lubrication to reduce friction and reduce wear or deterioration of the kinematic joint formed at the junctions of the links. Typical lubricants may include fluids or semisolid materials like grease or oil that are characterized by a viscosity that enables relative motion between the rigid links while reducing friction and wear and possibly preventing thermal heating of the joint. Complex mechanical machines in which the kinematic joints may be subjected to significant forces and loads may be associated with a lubrication system that introduces the lubricant to the kinematic joint. Conventional lubrication systems typically introduce lubricant to the plurality of kinematic joints at regular periods and in fixed quantities or amounts and may be comprised of numerous and complex structures, mechanisms, and control systems configured to meter and distribute the lubricant. The present application is directed to an improved lubrication system for dynamically and efficiently introducing lubricant to a plurality of kinematic joints on a complex mechanical machine wherein the kinematic joints may be considered distinguishable according to at least two operating functions.

SUMMARY

The disclosure describes, in one aspect, a machine including a first kinematic joint, wherein the first kinematic joint is lubricated based on a first schedule and a second kinematic joint, wherein the second kinematic joint is lubricated based on a second schedule. The first schedule is different than the second schedule. A lubricant pump is configured to pump a lubricant and a distribution valve is in communication with the lubricant pump. The distribution valve has a first fluid outlet configured to supply the lubricant from the lubricant pump to the first kinematic joint and a second fluid outlet configured to supply the lubricant from the lubricant pump to the second kinematic joint.

In another aspect, there is disclosed a system for supplying lubricant to a machine, the machine includes two, or more, kinematic joints. The system includes a lubricant pump configured to pump a lubricant. A distribution valve is in communication with the lubricant pump, the distribution valve having a first fluid outlet and a second fluid outlet. A first kinematic joint is lubricated by lubricant from the distribution valve based on a first schedule and a second kinematic joint is lubricated by lubricant from the distribution valve based on a second schedule, wherein the first schedule is different than the second schedule. The machine may also have more than two kinematic joints that have more than two lubrication schedules.

In yet another aspect, there is disclosed a machine including a first kinematic joint, wherein the first kinematic joint enables a first function of the machine and a second kinematic joint, wherein the second kinematic joint enables a second function of the machine. The first function is different than the second function. A lubricant pump is configured to pump a lubricant and a distribution valve is in communication with the lubricant pump. The distribution valve has a first fluid outlet configured to supply the lubricant from the lubricant pump to the first kinematic joint and a second fluid outlet configured to supply the lubricant from the lubricant pump to the second kinematic joint. The distribution valve is configured to supply the first kinematic joint separately from the second kinematic joint.

DETAILED DESCRIPTION

Figure 1:
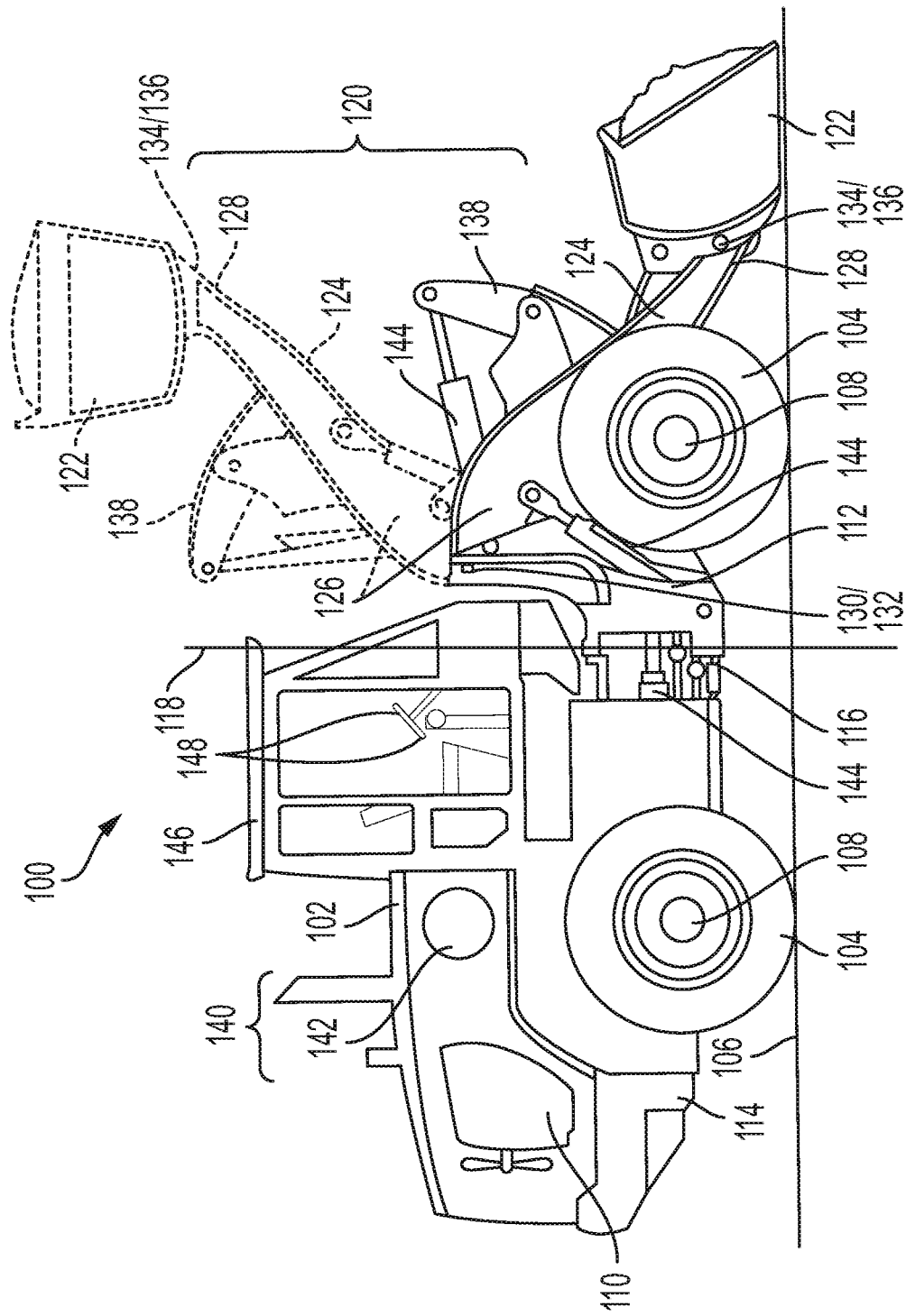
FIG. 1 is a side elevational view of an example of a mechanical machine in the embodiment of a wheel loader including an articulate machine frame and an implement linkage coupled to and configured to raise and lower a work implement like a bucket with respect to the machine frame.

Now referring to the figures, wherein whenever possible like reference numbers refer to like elements, there is illustrated an example of a complex mechanical machine in the form of a wheel loader 100 configured for lifting, hauling, and dumping materials such as soil, aggregate, rock, or the like. Wheel loaders 100, an example of which is shown in FIG. 1, may be used in construction operations like earth moving, excavation, material handling and similar operations. While the present disclosure is described with respect to a wheel loader, the disclosure is applicable to any mechanical machine with moving parts that are joined together by one or more kinematic linkages and that benefit from periodic lubrication with a lubricant such as grease or oil.

The wheel loader 100 can include a machine frame 102 supported on a plurality of wheels 104 that can rotate with respect to the frame to enable the wheel loader to move over the ground 106 or surface of a worksite. To enable rotation, the wheels 104 can be coupled to the machine frame through axle joints 108 or bearings that support a rotating axle fixed to the wheel. The wheels 104 may be further configured as powered drive wheels to which rotational torque is applied to drive the wheel loader 100 over the ground 106 and as steerable wheels that can be used to steer the wheel loader as it travels with respect to the ground.

To generate power for the drive wheels, the wheel loader 100 can include a prime mover or power plant in the form of an internal combustion engine 110 supported on the machine frame 102. The internal combustion engine 110 can combust a hydrocarbon-based fuel to convert the potential chemical energy therein to rotational power or torque that the machine 100 can harness for other work. Examples of suitable fuels to combust include diesel, gasoline, or less traditional fuels such as biofuels, natural gas, etc. In addition to providing power to the drive wheels, the internal combustion engine 110 can provide power to other operational systems and mechanisms associated with the wheel loader 100.

To facilitate steering of the wheel loader 100 with respect to the ground 106, the machine frame 102 may be an articulated machine frame including a forward frame end 112 and a rearward frame end 114 pivotally coupled together at a frame joint 116. The frame joint 116 enables the forward frame end 112 and rearward frame end 114 to pivot with respect to an articulation axis 118 that extends vertically through the frame joint 116. Accordingly, the wheels 104 located at the forward frame end 112 can be aligned in a different direction than the wheels located at the rearward frame end 114. The articulated machine frame 102 enables the wheel loader 100 to make turns when maneuvering over the ground 106.

To enable the wheel loader 100 to lift and haul material in accordance with its operative purpose, the wheel loader can include an implement linkage 120 coupled to a work implement 122. In the example of a wheel loader 100, the implement linkage 120 may be a lifting implement and the work tool 122 may be a bucket. More particularly, the implement linkage 120 can include one or more elongated lift arms 124 that can be made from rigid, structural steel and can extend between a proximal frame end 126 and a distal tool end 128. To raise and lower the lift arms 124 with respect to the machine frame 102, the proximal frame end 126 can be connected to the forward frame end 112 by a lift joint 130 that enables the lift arms to pivotally articulate with respect to the forward frame end. The lift joint 130 may be configured as a pivot joint and may define a lift axis 132 parallel to the ground and that extends through the location where the proximal frame end 126 is coupled to the forward frame end 112. By pivoting with respect to the lift axis 132, the implement linkage 120 can move between a lowered position with the work tool 122 adjacent the ground and a raised position with the work tool vertically evaluated above the ground.

By pivoting as described the lift joint 130 is therefore able to articulate the implement linkage 120 through a range of angular motion with respect to the machine frame 102. The ranges of angular motion may be referred to as different geometric configurations of the implement linkage 120 and may be associated with different tasks or functions being conducted, such as hauling, digging, or dumping. It can be appreciated that rather than allowing for full, 360-degree rotation, the angular range of articulation of the lift implement provided by the lift joint 130 may be constrained between the lowered position and the raised position as illustrated in FIG. 1.

In the example of a bucket, the work tool 122 can be an opened box-like structure configured to receive and contain material received from and hauled with respect to the ground 106. To haul and dump the material, the bucket may be pivotally connected to the distal tool end 128 of the lift arms 124 by a tilt joint 134. The tilt joint 134 defines a tilt axis 136, also horizontal with respect to the ground 106, which the work tool 122 can pivot with respect to the lift arms 124 associated with the implement linkage 120. In addition, to tilt the bucket, the implement linkage 120 can include one more other rigid structural member like a tilt arm 138 that are also pivotally connected, either directly or indirectly together, to facilitate pivotal articulation of the implement linkage 120 and work tool 122 with respect to each other and the machine frame 102.

To provide motive power to enable the forward frame end 112 and the rearward frame end 114 of the articulated machine 102 to articulate with respect to each other, as well as to enable the implement linkage 120 and the work tool 122 to pivot with respect to the machine frame 102, the wheel loader 100 can be operatively associated with a hydraulic system 140. The hydraulic system 140 can be configured to direct pressurized hydraulic fluid to one or more hydraulic actuators that convert the fluid pressure to mechanical motion. To pressurize the hydraulic fluid, the hydraulic system 140 can include a hydraulic pump 142 and the hydraulic actuator may be a plurality of hydraulic cylinders 144 disposed about the machine frame 102. The hydraulic cylinders 144 can include a cylindrical rod that can telescopically extend from or retract into a tubular cylinder body in response to the fluid pressure therein. In the illustrated embodiment of a wheel loader, the hydraulic cylinders 144 may include a frame cylinder to actuate the frame joint 116, a lift cylinder to actuate the lift arms 124 of the implement linkages, and a tilt cylinder to actuate tilting of the work tool 122 with respect to the lift arms.

To accommodate an operator, the wheel loader 100 can include an onboard operator cab 146 or operator station disposed on the machine frame 102 at a location providing visibility over the ground 106 and about the worksite. The operator cab 146 can include a plurality of various input/output interfaces 148 like a steering wheel, acceleration pedals, brakes, shift levers, control levers, joysticks, and the like that enable the operator to direct operation of the wheel loader including, by way of example, the implement linkage 120. The wheel loader 100 may also be configured for remote operation and the interfaces associated with the operator cab 146 may be located off-board at a remote location.

The articulated machine frame 102 and the implement linkage 120 coupled to the work tool 122 are examples of kinematic linkages in which rigid links or bodies can articulate, rotate, or otherwise move with respect to each other. The frame joint 116, the lift joint 130 and the tilt joint 134 are thus examples of kinematic linkages with joints that enable the rigid bodies, such as the forward and rearward frame ends 112, 114, the lift arms 124, and the work tool 122, to pivotally articulate or otherwise move between the different geometric configurations. In a complex mechanical machine such as the illustrated wheel loader 100, the kinematic joints may be subjected to cyclic and repeated loads and stresses, at least some of which are subject to significant load and therefore, the potential for significant wear and even damage over time.

For example, the implement linkage 120 via the lift joint 130 may repeatedly move between the raised position or configuration and the lowered position or configuration, which may be referred to as a work cycle associated with digging, hauling, and dumping material. The frame joint 116 and the tilt joint 134 may likewise be cyclically moved through a range of angular motion. To reduce friction and increase component wear life associated with motion of those kinematic joints under the applied loads, the wheel loader 100 may be operatively associated with a lubrication system to dynamically direct a fluid or viscous lubricant to the kinematic joints.

Figure 2:
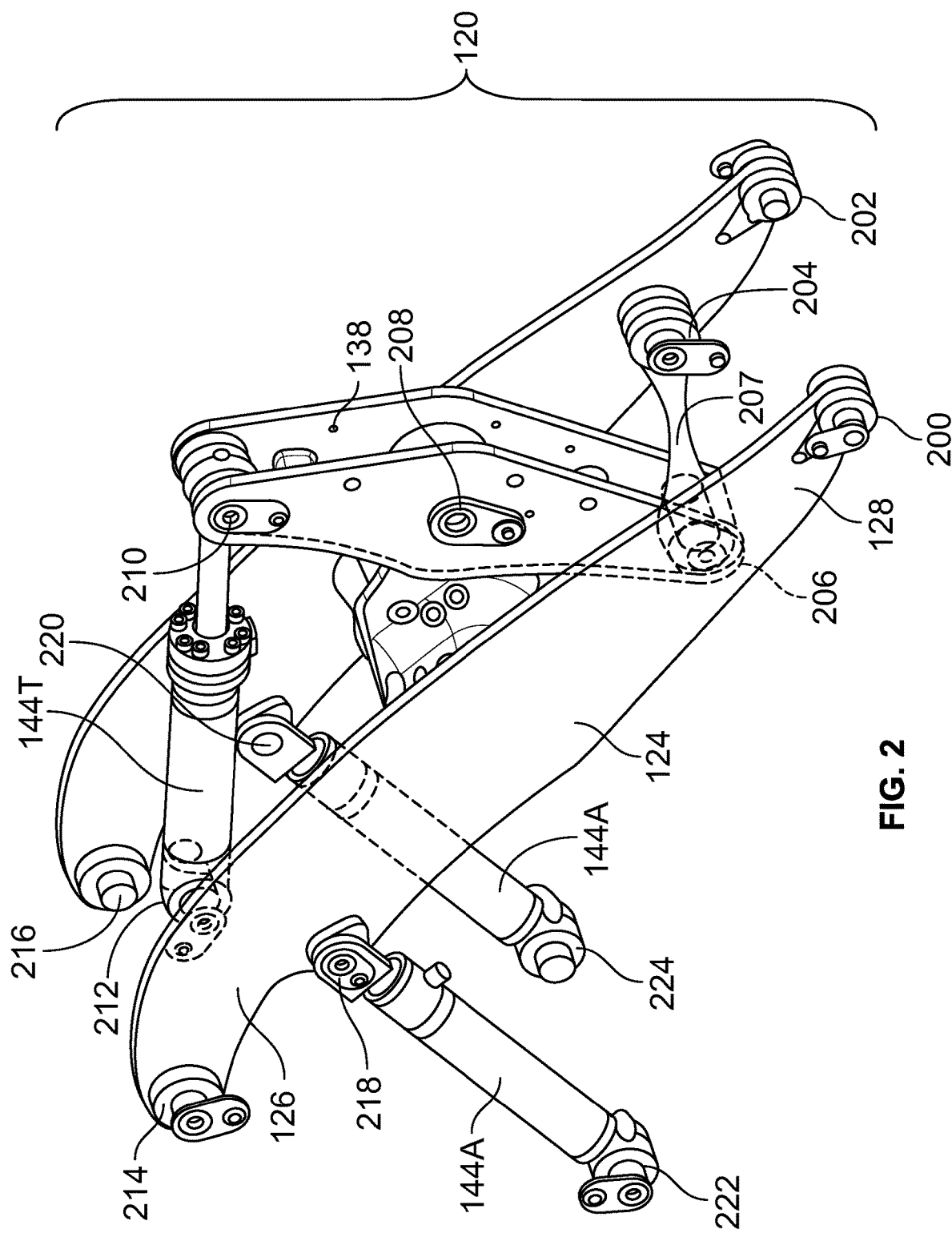
FIG. 2 is an example of an implement linkage, with a plurality of lubrication points, that can be used with the machine of FIG. 1.

Referring to FIG. 2, there is illustrated a detailed illustration of the implement linkage 120 of FIG. 1. It will be understood that the structural details of the implement linkage 120 being illustrated herein is that of a well-known assembly and system, and therefore all aspects of the linkage will not be discussed in detail. The illustrated linkage 120 has the purpose of illustrating an example of principles of the disclosure. The disclosure contemplates any structural assembly comprising two or more kinematic joints or linkages.

The implement linkage 120 includes a pair of elongate lift arms 124. The lift arms 124, at a proximal frame end thereof 126 includes, respectively, a right proximal lift arm pin 214 and a left proximal lift arm pin 216. The right proximal lift arm pin 214 and left proximal lift arm pin 216 permit attachment to and pivoting of the lift arms 124 relative to the machine 100.

The implement linkage 120 includes a pair of lifting actuators 144A, each respectively attached to and configured to raise and lower the lift arms 124. The lifting actuators 144A may each be a hydraulically actuated cylinder. Each of the lifting actuators 144A has a respective actuator lift arm pin 218, 220 attached to a respective lift arm 124 and, on an end opposite end thereof, an actuator frame pin 222, 224 attached to the machine 100 at lift joint 130 (FIG. 1). The lifting actuators 144A share an operational function related to lifting of the work tool 122 via raising and lowering the lift arms 124 and share similar lubrication requirements. Therefore, the pins involved in the lifting function can be grouped together and are considered an arm lifting pin group (214, 216, 218, 220, 222, and 224). The pins of the arm lifting pin group (214, 216, 218, 220, 222, and 224), having a similar function have similar lubrication requirements, are lubricated concurrently on the same schedule. The schedule may be predetermined or determined using real time data, for example. In addition, as will be described herein, while the pins of the arm lifting group (214, 216, 218, 220, 222, and 224) are lubricated on the same schedule, they may have different requirements in terms of an amount of lubricant. However, it will be understood that the pins of the arm lifting group are to be considered to share the same lubrication schedule at least because they all have the same or similar lubrication requirements in operation. One known method of determining such lubrication requirements involves determining a cumulative tribological effect associated with each kinematic joint based on, for example, one or more of a cumulative cyclic count, a cumulative structural load, and a cumulative distance of relative motion. This disclosure contemplates any effective means of determining and/or selecting a lubrication schedule for any or all of the kinematic linkages and so on such that joints with similar lubrication requirements can be grouped for efficient structuring and operation of lubrication systems and use of lubrication resources. For purposes of this disclosure, schedule is used to mean one or more of on a selected time, according to a selected plan, according to predetermined conditions, or according to real time specified determinations or thresholds.

Opposite the proximal frame end 126 is a distal tool end 128 where work implements or a work tool 122 is located and attached. The lift arms 124 of the distal tool end 128 includes, respectively, a right distal lift arm pin 200 and a left distal lift arm pin 202, which enable attachment of the work tool 122 to the lift arms. When the lift arms 124 are raised and lowered, the right distal lift arm pin 200 and the left distal lift arm pin 202 share an operational function related to holding and lifting of the work tool 122. The right distal lift arm pin 200 and left distal lift arm pin 202 are attached directly to the work tool 122 and it has been determined that the lubrication requirements are different from the pins of the arm lifting group (214, 216, 218, 220, 222, and 224). For this reason, the right distal lift arm pin 200 and the left distal lift arm pin 202 are considered a group different from the arm lifting group. For purposes of this disclosure, the right distal lift arm pin 200 and the left distal lift arm pin 202 will be considered the tool lifting group (200, 202) and are lubricated on a different schedule relative to the arm lifting group.

The implement linkage 120 includes a tilt arm 138. The tilt arm 138 includes a tilt arm center pin 208, which is located about midway between the ends of the tilt arm. The tilt arm center pin 208 is positioned to permit the tilt arm 138 to pivot about the tilt arm pin. The implement linkage 120 includes a tilt actuator 144T, which may be a hydraulically actuated cylinder, which is attached to the tilt arm 138 and the machine 100 to cause the tilt arm to rotate about the tilt arm center pin 208. The implement linkage 120 includes a tilt actuator pin 212, which enables the tilt actuator 144T to attach to the machine 100. The tilt arm 138 includes a tilt arm actuator pin 210 which enables the tilt actuator 144T to attach to the tilt arm.

The pins 208, 210, and 212 of the tilt arm 138 and tilt actuator 144T share an operational function related to tilting of the work tool 122 via rotation of the tilt arm 138 and share similar lubrication requirements. Therefore, the pins 208, 210, and 212 involved in the tilting function can be grouped together and therefore are considered as a tilting pin group (208, 210, and 212). The tilting pin group pins 208, 210, and 212, having a similar function have similar lubrication requirements and are lubricated on the same selected schedule at the same time. In addition, as will be described herein, while the pins of the tilting group (208, 210, and 212) are lubricated on the same schedule, they may have different requirements in terms of an amount of lubricant.

Alternatively, the tilt actuator pin 212, located at the base of the tilt arm 138, can be supplied with a separate feed from that of the other pins 208, 210 of the tilting group. For purposes of this disclosure, the tilt actuator pin 212 may be considered a tilt pin base group (212).

The tilt arm 138 includes a tool link pin 206, which permits a tool link 207 to attach to the tilt arm. In addition, the implement linkage 120 includes a tool link tool pin 204, which enables the tool link 207 to attach to the work tool 122 (FIG. 1). The tool link pin 206 and the tool link tool pin 204 have a different lubrication requirement relative to others of the tilting group. For purposes of this disclosure, the tool link pin 206 and the tool link tool pin 204 will be considered as the tool pin group (204, 206).

In summary, the pins of FIG. 2 are grouped into four distinct groups representing pins according to their function and thus their lubrication requirements and a resulting schedule. Typically, all of the pins of a selected group are provided with lubricant concurrently according to a predetermined schedule or a schedule that is determined according to sensed conditions of the implement linkage 120 or any suitable method of determining lubrication needs. However, when one pin of a selected group requires more lubricant than others, for example, lubricant can be supplied to that pin during and in addition to supplying lubricant to other(s).

Figure 4:
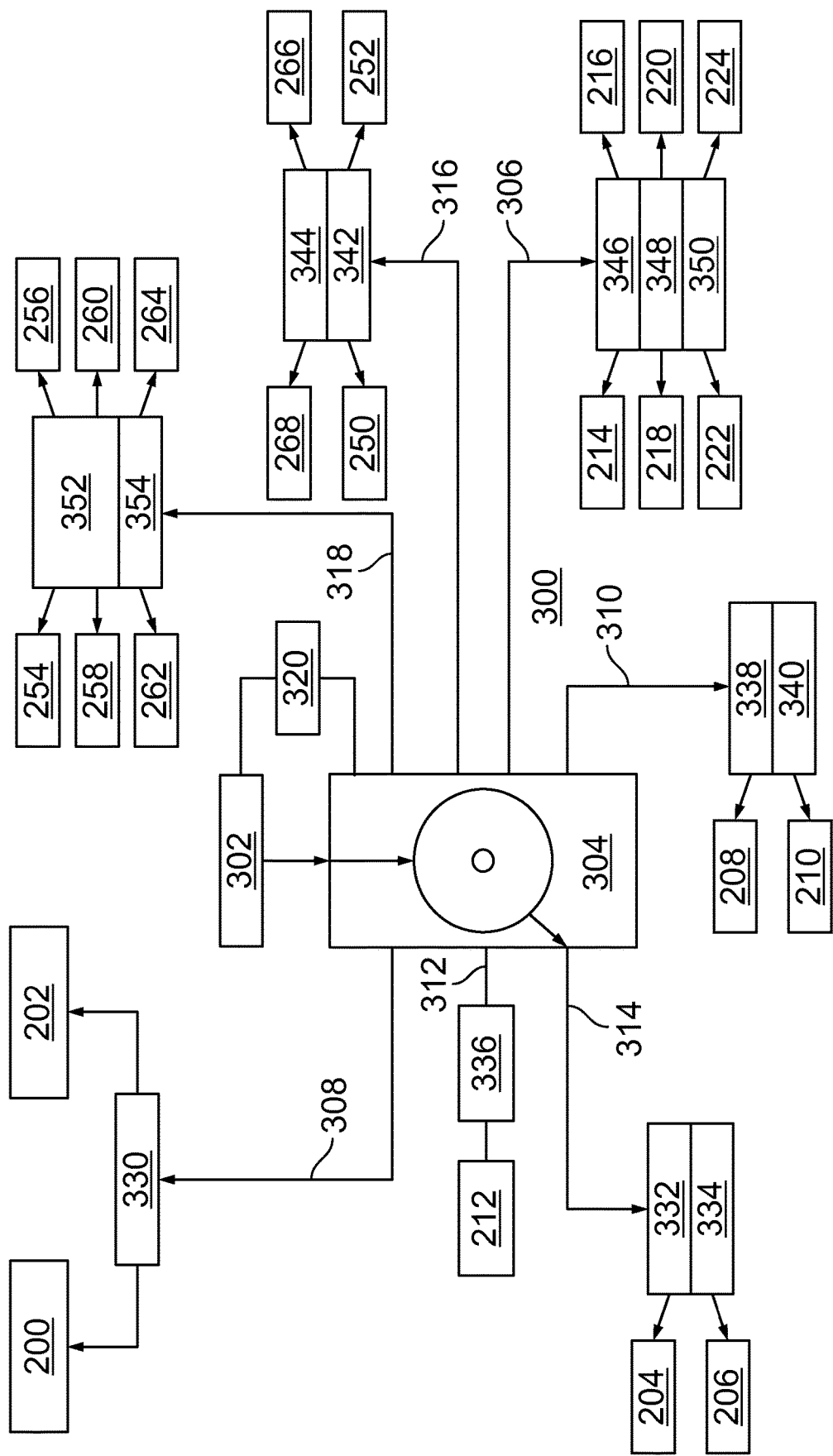
FIG. 4 is a schematic diagram of a lubrication system including a lubricant pump and a distribution valve configured to selectively direct lubricant to lubrication points associated with kinematic linkages of the mechanical machine of FIG. 1.

As will be shown in connection with FIG. 4, the machine 100 will have a distribution valve or router that supplies lubricant concurrently to all of the pins of the arm lifting pin group (214, 216, 218, 220, 222, and 224), separately from lubricant concurrently supplied to all of the tilting group pins (208, 210, and 212), separately from lubricant concurrently supplied to the tool pin group (204, 206), and separately from lubricant concurrently supplied to the tool lifting group (200, 202).

Figure 3:
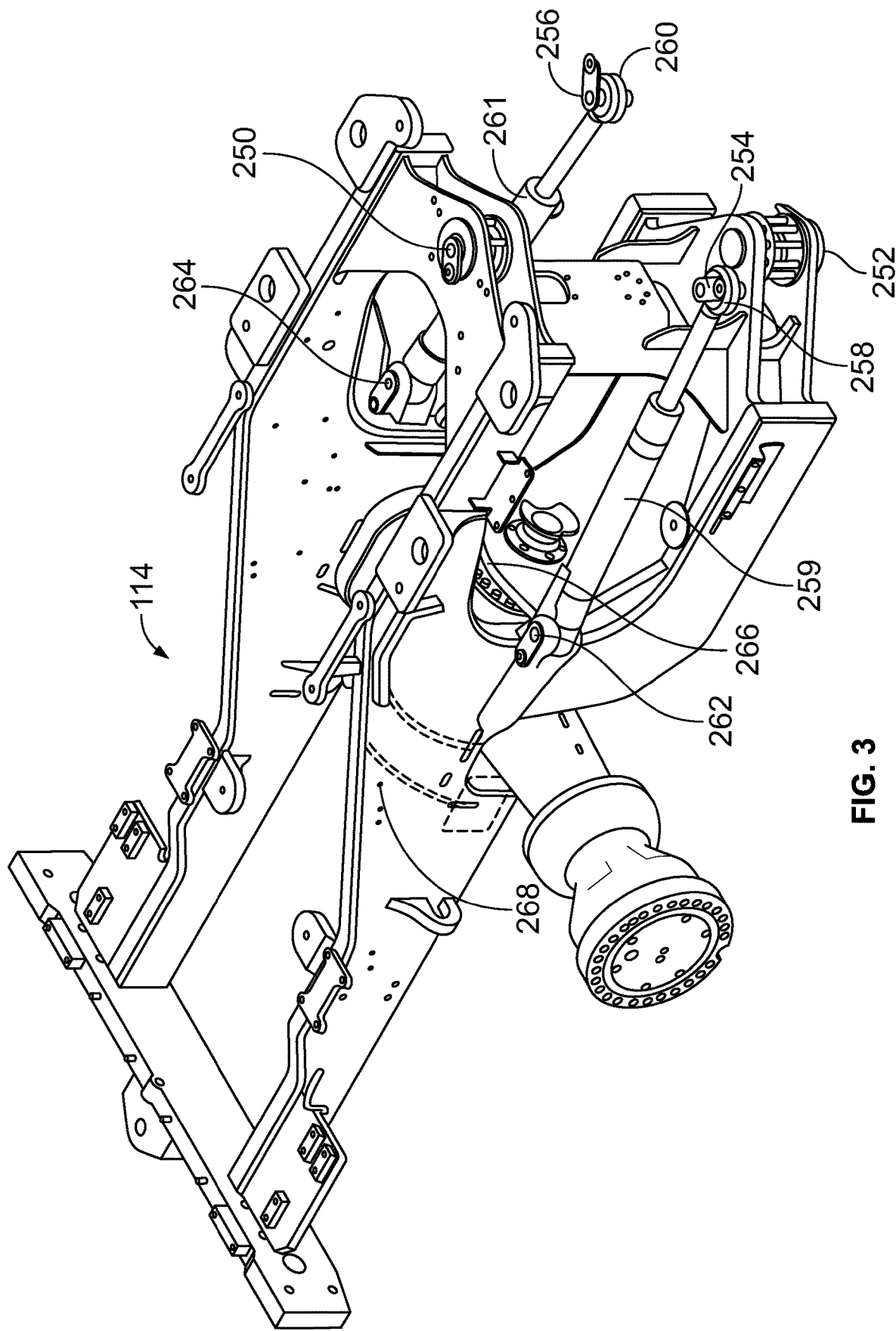
FIG. 3 is an example of a rear subframe assembly with associated mechanisms with a plurality of lubrication points.

Referring to FIG. 3, an exemplary frame subassembly 114 is illustrated with a plurality of kinematic joints. The frame subassembly 114 includes an upper hitch 250 and a lower hitch 252 which are configured to attach a further frame assembly to the frame assembly so as to permit a horizontal pivot action therebetween. The frame subassembly 114 also includes a front trunnion 266 and a rear trunnion 268. The front and rear trunnions 266, 268 are pins or pivots that permit relative rotation between attached parts. Collectively, the upper hitch 250, lower hitch 252, front trunnion 266, and rear trunnion 268 are grouped together and supplied with lubrication concurrently and will be referred to as the frame pivot group (250, 252, 266, and 268).

The frame assembly 114 includes structures that share a steering function. The steering structures include a right steering pin 254 positioned in a right steering eye 258. The right steering pin 254 and right steering eye 258 are disposed at the movable end of a right steering actuator 259, which may be in the form of a first hydraulic cylinder. The steering structures include a left steering pin 256 positioned in a left steering eye 260. The left steering pin 256 and left steering eye 260 are disposed at the movable end of a left steering actuator 261, which may be in the form of a second hydraulic cylinder.

The fixed end of each of the first steering actuator 259 and the second steering actuator 261 are respectively pivotally attached to the frame assembly 114 by a right steering pivot pin 262 and a left steering pivot pin 264. Collectively, the right steering pin 254, the right steering eye 258, the left steering pin 256 and the left steering eye 260, the right steering pin 254, and the left steering pin 264 are grouped together and supplied with lubrication concurrently and will be referred to as the steering group (254, 256, 258, 260, 262, and 264).

In summary, the pins of FIG. 3 are grouped into two distinct groups representing pins that are disposed on the machine subframe 114 according to their function and thus their lubrication requirements and a resulting schedule. All of the pins of a selected group are provided with lubricant concurrently according to a predetermined schedule or a schedule that is determined according to sensed conditions or any suitable method of determining lubrication needs.

As will be shown in connection with FIG. 4, the machine 100 will have a distribution valve or router that also supplies, in addition to the groups of the implement linkage 120, lubricant concurrently to all of the pins of the frame pivot group (250, 252, 266, and 268), separately from lubricant concurrently supplied to all of the steering group (254, 256, 258, 260, 262, and 264).

Referring to FIG. 4, the machine (FIG. 1) has a lubricant distribution system 300 for distributing lubricant that includes a lubricant pump 302 configured to supply pressurized fluid, i.e., lubricant, to a distributor 304. The lubricant pump 302 can be any suitable type of pump such as a gear pump with internal intermeshing gears. Relative rotation of the intermeshing gears will displace and direct the grease or other viscous lubricant though the lubrication system 300. The lubricant pump 302 may also be driven by a stepper motor than can be controlled to deliver a metered amount of lubricant upon receiving an appropriate command. Alternatively, the lubricant pump 302 can be a variable displacement pump. The lubricant used with the lubrication system 300 can be any suitable lubricant such as an oil or grease that has a suitable viscosity and can be made to flow.

The distributor 304 can be configured with a plurality of outputs for delivering lubricant from the pump 302, where the number of outputs is equal to the number of groups of joints of the machine 100 configured to be serviced by the distributor. In the present example, the system 300 has seven (7) outputs, one output for each group. The disclosure contemplates more or less than seven outputs, each configured to supply lubricant concurrently to pins of a selected group. The distributor 304 may be any suitable valve mechanism that is configured to direct the flow of fluid/lubricant to a selected outlet.

To regulate and selectively control operation of the lubrication system 300, the lubrication system can be associated with a computing device such as an electronic control unit (ECU), electronic control module (ECM), or, as referred to herein, an electronic controller 320. The electronic controller 320 can be a programmable computing device and can include one or more microprocessors, non-transitory computer readable and/or writeable memory or a similar storage medium, input/output interfaces, and other appropriate circuitry for processing computer executable instructions, programs, applications, and data, as is well known. The electronic controller 320 may be configured to process digital data in the form of binary bits and bytes and can have any suitable configuration such as an application specific integrated circuit (ASIC), a field programmable gate array (FPGA), or a similar configuration. In addition to regulating the lubrication system 300, the electronic controller 320 may be responsible for monitoring and regulating operation of the other systems and devices associated with the wheel loader or other complex mechanical machine. Although illustrated as a unitary device, the electronic controller 320 and its functionality may be distributed among a plurality of computing devices. In particular, the electronic controller 320 is configured to operate the pump 302 and distributor 304 to supply lubricant according to a predetermined schedule or according to determinations made by the electronic controller based on operating conditions of the machine 100.

In the example shown, the distributor 304 is configured to connect the source of lubricant, i.e., the pump 302, to a selected output in communication with a group via a conduit. The connection may be a single conduit directly connected to the pin or feature of the machine 100 which is to be supplied with lubricant. A conduit interconnects each output of the distributor 304 to the selected group destination. Therefore, if the system 300 has seven group groups, there are seven outputs of the distributor 304 and seven conduits, each of the seven conduits in communication with a respective one of the seven outputs. In embodiments, the distributor 304 is configured to supply lubricant from the pump 302 to only one of the plurality of outputs of the distributor and therefore, conduits of the system 300, at a time.

For example, and referring to the previous figures, a first conduit 306 connects the distributor 304 to the arm lifting pin group (214, 216, 218, 220, 222, and 224). A second conduit 308 connects the distributor 304 to the tool lifting group (200, 202). A third conduit 310 connects the distributor 304 to the tilting pin group (208, 210). A fourth conduit 312 connects the distributor 304 to the tilt pin base group (212). A fifth conduit 314 connects the distributor 304 to the tool pin group (204, 206). A sixth conduit 316 connects the distributor 304 to the frame pivot group (250, 252, 266, and 268). A seventh conduit 318 connects the distributor 304 to the steering group (254, 256, 258, 260, 262, and 264). It will be understood that the number of outputs from the distributor and conduits shown in the present example is not intended to be limiting.

In embodiments, the system 300 may include one or more control valves disposed between the distributor 304 and each of the groups. The control valves are configured to control the flow of fluid from the conduits to elements of the groups. In an embodiment, a conduit may feed lubricant to two or more control valves to selectively permit different volumes of lubricant to be delivered to different pins of a single group opening the valves a different amount or a different amount of time. In other words, when some of the pins of a group require a different volume of lubricant than others for that pin or set of pins to be properly lubricated valves may be employed to deliver different volume of lubricant to different pins or the like of a group.

For example, the system 300 includes a single valve 330 configured to receive lubricant from conduit 308 for controlling the flow of lubricant to the elements of the tool lifting group (200, 202). All of the elements of the tool lifting group receive the same amount of lubricant at the same time because the elements have been determined to require lubrication at the same intervals and have a configuration requiring the same volume of lubricant. The tilt pin base group (212) also has a single valve 336 in communication with conduit 312 in the same configuration as that of the tool lifting group (200, 202).

The system 300 includes two valves 332, 334 configured to receive lubricant from conduit 314 for controlling the flow of lubricant separately to the two elements of the tool pin group (204, 206). In the two-valve arrangement shown, the controller 320, which is in communication with all of the valves, may leave one of the two valves 332, 334 open for a longer period of time relative to the other to supply a greater amount of lubricant to one of the two pins of the tool pin group (204, 206).

The system 300 includes two valves 338, 340 configured to receive lubricant from conduit 310 for controlling the flow of lubricant separately to the two elements of the tilting pin group (208, 210). In the two-valve arrangement shown, the controller 320, which is in communication with all of the valves, may leave one of the two valves 338, 340 open for a longer period of time relative to the other to supply a greater amount of lubricant to one of the two pins of the tool pin group tilting pin group (208, 210).

The system 300 includes two valves 342, 344 configured to receive lubricant from conduit 316 for controlling the flow of lubricant separately to the four elements of the frame pivot group (250, 252, 266, and 268). In the two-valve arrangement shown, the controller 320, which is in communication with all of the valves, may leave one of the two valves 342, 344 open for a longer period of time to supply a greater amount of lubricant to one of the two sets of pins of the frame pivot group (250, 252, 266, and 268).

The system 300 includes three valves 346, 348, 350 configured to receive lubricant from conduit 316 for controlling the flow of lubricant separately to the six elements of the arm lifting pin group (214, 216, 218, 220, 222, and 224). In the three-valve arrangement shown, the controller 320, which is in communication with all of the valves, may leave one or two of the three valves 346, 348, 350 open for a longer period of time to supply a greater amount of lubricant to one or two of the three sets of pins of the arm lifting pin group (214, 216, 218, 220, 222, and 224).

The system 300 includes two valves 352, 354 configured to receive lubricant from conduit 318 for controlling the flow of lubricant separately to the six elements of the steering group (254, 256, 258, 260, 262, and 264). In the two-valve arrangement shown, the controller 320, which is in communication with all of the valves, may leave one of the two valves 352, 354 open for a longer period of time to supply a greater amount of lubricant to one of the two sets of pins of the steering group (254, 256, 258, 260, 262, and 264).

INDUSTRIAL APPLICABILITY

In accordance with the disclosure, the electronic controller 320 associated with the wheel loader 100 or similar mechanical machine may be programmed to conduct kinematic computations to facilitate lubrication of the various kinematic joints associated with the machine using the lubrication system 300. For example, the electronic controller 320 can determine appropriate instances to deliver lubricant to a kinematic joint 200 based on machine operational data or may determine the appropriate quantities of lubricant to deliver based on geometry data associated with the kinematic joint and the kinematic linkage. The kinematic equations can be conducted by computer executable software programs and applications written in a computer readable programing language. It will be understood that the system 300 of the present disclosure may be configured and applied to any machine with two or more kinematic joints with different lubrication schedule requirements.

It will be appreciated that the foregoing description provides examples of the disclosed system. However, it is contemplated that other implementations of the disclosure may differ in detail from the foregoing examples. All references to the disclosure or examples thereof are intended to reference the example being discussed at that point of the disclosure and are not intended to imply any limitation as to the scope of the disclosure and the protection to which applicant is entitled more generally. All language of distinction and disparagement with respect to certain features is intended to indicate a lack of preference for those features, but not to exclude such from the scope of the disclosure entirely unless otherwise indicated.

We claim:
1. A machine comprising:
 a first kinematic joint, wherein the first kinematic joint is lubricated based on a first schedule;
 a second kinematic joint, wherein the second kinematic joint is lubricated based on a second schedule, wherein the first schedule is different than the second schedule;
 a lubricant pump configured to pump a lubricant; and
 a distribution valve in communication with the lubricant pump, the distribution valve having a first fluid outlet configured to supply the lubricant from the lubricant pump to the first kinematic joint and a second fluid outlet configured to supply the lubricant from the lubricant pump to the second kinematic joint, wherein the first fluid outlet and the second fluid outlet are connected to one or more control valves for separately controlling the flow of lubricant to the first kinematic joint and the second kinematic joint, and wherein at least one of the first fluid outlet or the second fluid outlet is connected to at least two of the control valves.

2. The machine of claim 1 comprising more than two separate kinematic joints and more than two lubrication schedules.

3. The machine of claim 1 wherein the first kinematic joint and the second kinematic joint enable movement of an implement linkage.

4. The machine of claim 3 wherein the implement linkage enables lifting and lowering of an implement and tilting of the implement.

5. The machine of claim 4 wherein the first kinematic joint enables one of the lifting and lowering or the tilting of the implement and the second kinematic joint enables the other of the lifting and lowering or the tilting of the implement.

6. The machine of claim 1 wherein one of the first kinematic joint or the second kinematic joint enables movement of a forward frame end and a rearward frame end relative to each other.

7. The machine of claim 6 wherein one of the first kinematic joint or the second kinematic joint enables the forward frame end to pivot relative to the rearward frame end.

8. The machine of claim 7 wherein the other of the first kinematic joint or the second kinematic joint is associated with a steering group.

9. The machine of claim 1 wherein the first schedule and the second schedule includes one or more of a selected time, a selected plan, predetermined conditions, or real time specified determinations or thresholds.

10. The machine of claim 1 wherein the first kinematic joint is configured to enable a first function of the machine and the second kinematic joint is configured to enable a second function of the machine, wherein the first function is different than the second function.

11. The machine of claim 1 wherein the machine has a lift function, a tilt function, a steering function, and a work tool configured to load and carry material.

12. The machine of claim 11 wherein the first kinematic joint is associated with one of an arm lifting pin group, a tool lifting group, a tilting pin group, a tilt pin base group, a tool pin group, a frame pivot group, or a steering group.

13. The machine of claim 12 wherein the second kinematic joint is associated with a different one of the arm lifting pin group, the tool lifting group, the tilting pin group, the tilt pin base group, the tool pin group, the frame pivot group, or the steering group.

14. The machine of claim 13 wherein the arm lifting pin group, the tool lifting group, the tilting pin group, the tilt pin base group, the tool pin group, the frame pivot group, and the steering group are each lubricated via a separate circuit and on a separate schedule.

15. The machine of claim 1 further comprising a controller in operative communication with the lubricant pump and the distribution valve.

16. The machine of claim 15, wherein the controller is configured to:

estimate a first cumulative tribological effect associated with the first kinematic joint and a second cumulative tribological effect associated with the second kinematic joint based on one or more of a cumulative cyclic count associated with a respective one of the first kinematic joint and the second kinematic joint;

estimate a cumulative structural load associated with a respective one of the first kinematic joint and the second kinematic joint; and estimate a cumulative distance of relative motion associated with a respective one of the first kinematic joint and the second kinematic joint.

17. The machine of claim 15 wherein the first fluid outlet and the second fluid outlet are in respective communication with a first conduit configured to supply lubricant from the pump to the first kinematic joint and a second conduit configured to supply lubricant from the pump to the second kinematic joint.

18. The machine of claim 17 wherein the first conduit includes a valve for controlling flow of lubricant from the first fluid outlet to the first kinematic joint and the second conduit includes a valve for controlling flow of lubricant from the second fluid outlet to the second kinematic joint.

19. The machine of claim 1 comprising a plurality of first kinematic joints of a first kinematic linkage, and a plurality of second kinematic joints of a second kinematic linkage.

20. A system for supplying lubricant to a machine including a plurality of kinematic joints, the system comprising:

a lubricant pump configured to pump a lubricant; and a distribution valve in communication with the lubricant pump, the distribution valve having a first fluid outlet and a second fluid outlet, wherein lubricant from the first fluid outlet of the distribution valve is configured to lubricate a first kinematic joint of the machine based on a first schedule;

wherein lubricant from the second fluid outlet of the distribution valve is configured to lubricate a second kinematic joint of the machine based on a second schedule, wherein the first schedule is different than the second schedule, wherein at least one of the first fluid outlet and the second fluid outlet are connected to one or more control valves for separately controlling the flow of lubricant to the kinematic joints, and wherein at least one of the first fluid outlet or the second fluid outlet is connected to at least two of the control valves.

21. The system of claim 20 further comprising a controller in operative communication with the lubricant pump and the distribution valve, the controller configured to cause the lubricant pump and the distribution valve to output lubricant to the first kinematic joint according to the first schedule and the second kinematic joint according to the second schedule.

22. A machine comprising:

a first kinematic joint, wherein the first kinematic joint enables a first function of the machine;

a second kinematic joint, wherein the second kinematic joint enables a second function of the machine, wherein the first function is different than the second function;

a lubricant pump configured to pump a lubricant; and a distribution valve in communication with the lubricant pump, the distribution valve having a first fluid outlet configured to supply the lubricant from the lubricant pump to the first kinematic joint and a second fluid outlet configured to supply the lubricant from the lubricant pump to the second kinematic joint, wherein the distribution valve is configured to supply the first kinematic joint separately from the second kinematic joint, wherein the first fluid outlet and the second fluid outlet are connected to one or more control valves for separately controlling the flow of lubricant to the first kinematic joint and the second kinematic joint, and wherein at least one of the first fluid outlet or the second fluid outlet is connected to at least two of the control valves.

* * * * *